(12) United States Patent
Yasuda et al.

(10) Patent No.: US 7,652,970 B2
(45) Date of Patent: Jan. 26, 2010

(54) LIGHT INFORMATION APPARATUS AND CONTROL METHOD OF LIGHT INFORMATION APPARATUS

(75) Inventors: Katsuhiko Yasuda, Osaka (JP); Hidenori Wada, Kyoto (JP); Takeharu Yamamoto, Osaka (JP); Toshio Matsumoto, Kyoto (JP)

(73) Assignee: Panasonic Corporation, Osaka (JP)

( * ) Notice: Subject to any disclaimer, the term of this patent is extended or adjusted under 35 U.S.C. 154(b) by 396 days.

(21) Appl. No.: 11/568,014

(22) PCT Filed: Jun. 20, 2005

(86) PCT No.: PCT/JP2005/011296

§ 371 (c)(1),
(2), (4) Date: Oct. 17, 2006

(87) PCT Pub. No.: WO2005/124749

PCT Pub. Date: Dec. 29, 2005

(65) Prior Publication Data
US 2007/0253068 A1 Nov. 1, 2007

(30) Foreign Application Priority Data
Jun. 21, 2004 (JP) .............................. 2004-182637

(51) Int. Cl.
G11B 7/00 (2006.01)

(52) U.S. Cl. .................................. 369/112.01; 369/116

(58) Field of Classification Search .............. 369/44.23, 369/44.24, 112.01, 112.02, 112.24, 112.1, 369/116
See application file for complete search history.

(56) References Cited

U.S. PATENT DOCUMENTS 6,721,259 B1 4/2004 Yamamoto et al.
6,925,046 B2 * 8/2005 Kuwahara et al. ...... 369/112.24

FOREIGN PATENT DOCUMENTS

| JP | 2000-131603 A | 5/2000 |
| JP | 2003-077142 | 3/2003 |
| JP | 2003-099976 | 4/2003 |
| JP | 2003-109239 A | 4/2003 |
| JP | 2003-132573 A | 5/2003 |

OTHER PUBLICATIONS

International Search Report for Application No. PCT/JP2005/011296, dated Sep. 6, 2005.

* cited by examiner

*Primary Examiner*—Nabil Z Hindi
(74) *Attorney, Agent, or Firm*—RatnerPrestia

(57) ABSTRACT

An optical information apparatus includes a laser which emits a light beam, an objective lens and the like which converge a light beam emitted from the laser on an optical recording medium, spherical aberration correction instrument which is arranged on an optical axis of the light beam which links the laser and the objective lens, and corrects a spherical aberration generated on the optical recording medium. Correction is performed so that outgoing power of the laser changes according to a correction amount by the spherical aberration correction instrument.

30 Claims, 12 Drawing Sheets

| SPHERICAL ABERRATION CORRECTION AMOUNT | LIGHT QUANTITY CORRECTION COEFFICIENT |
|---|---|
| S A 1 | $\alpha sa1$ |
| S A 2 | $\alpha sa2$ |
| S A 3 | $\alpha sa3$ |
| S A 4 | $\alpha sa4$ |
| ⋮ | ⋮ |
| S A n | $\alpha san$ |

24

CASE OF THICK SUBSTRATE THICKNESS (CONTINUOUS LINE)

CASE OF THIN SUBSTRATE THICKNESS (DOTTED LINE)

SPHERICAL ABERRATION CORRECTION AMOUNT

LIGHT INFORMATION APPARATUS AND CONTROL METHOD OF LIGHT INFORMATION APPARATUS

This application is a U.S. national phase application of PCT International Application PCT/JP2005/011296, filed Jun. 20, 2005.

TECHNICAL FIELD

The present invention relates to an optical information apparatus which performs write-in and read-out of an information signal to an optical recording medium like an optical disk, a magneto-optical disk, or an optical card, its control method, and the like.

BACKGROUND ART

Optical memory technology using an optical recording medium having a pit-like pattern as a high-density and large-capacity memory medium has been practically used while having extended applications such as a digital versatile disk (DVD), a video disk, a document file disk, and further a data file.

In recent years, in order to further highly densify recording density of an optical recording medium, it has been investigated to enlarge numerical aperture (NA) of an objective lens which converges a light beam on an optical recording medium to form a diffraction-limited minute spot. However, spherical aberration resulting from an error of thickness of a protective layer protecting a recording layer of an optical recording medium is proportional to the biquadrate of NA. As for an error of thickness, in particular in a high-density disk like a Blu-ray disk, since thickness of an original protective layer is thin (it is 0.1 mm in the case of a Blu-ray disk), it becomes impossible to disregard an effect which appears as a spherical aberration even if an absolute value of dispersion is very small. Hence, in the case of making NA large at such as 0.8 or 0.85, it becomes indispensable to provide instrument which connects the spherical aberration in the above-mentioned optical system.

There is multilayering of an optical recording medium as a method of further enlarging storage capacity of an optical recording medium. Generally, in an optical recording medium which has a plurality of recording layers, since an interlayer is arranged between respective recording layers, amounts of spherical aberrations generated at the time of focusing respective recording layers differ. For this reason, it becomes indispensable to correct a spherical aberration at every recording layer which is focused.

Then, in particular, as structure for correcting a spherical aberration generated by thickness dispersion of a protective layer of an optical recording medium, and a manufacturing error of a lens, Japanese Patent Laid-Open No. 2000-131603 proposes inserting an expander lens, which is constituted of two lenses, between a laser and an objective lens to perform variable adjustment of a space between the two lenses which constitute this expander lens.

An example of a conventional optical information apparatus mentioned above will be explained with reference to drawings here.

FIG. 12 is a schematic diagram showing structure of the conventional optical information apparatus, which is constituted of an optical head 1, focus control instrument 19, tracking control instrument 20, laser power control instrument 21, reproduced signal processing instrument 102, and a controller 103.

In addition, the optical head 1 is constituted of a laser 2, a diffraction grating 3, a collimator lens 4, a polarization beam splitter 5, a mirror 7, a quarter wavelength plate 8, an objective lens 9, a condenser lens 11, a cylindrical lens 12, a photodetector 13, an opening 16 for an objective lens, and an actuator 17. Furthermore, spherical aberration correction instrument 24 is constituted of a lens group 6 and driving instrument 18.

Here, the laser 2 is a laser which is constituted of, for example, a GaN-based semiconductor laser element (wavelength of 405 nm), and outputs coherent light for record and reproduction to a recording layer of an optical recording medium 10. The diffraction grating 3 is an optical element in which a concavo-convex pattern is formed on a surface of a glass substrate, and which divides an incident beam into three beams to enable detection of a tracking error signal by a so-called three-beam method.

The collimator lens 4 is a lens which converts divergent light, emitted from the laser 2, into parallel light. The polarization beam splitter 5 is an optical element whose transmittance and reflectivity change in a polarized direction of incident light, and which separates the light. The spherical aberration correction instrument 24 is an instrument which connects a spherical aberration generated by thickness dispersion of a protective layer and the like of the optical recording medium 10, and which is constituted of a concave lens 6a, a convex lens 6b, and driving instrument 18, and it is possible to correct the above-mentioned spherical aberration by changing a space between the concave lens 6a and convex lens 6b. The mirror 7 is an optical element which reflects incident light to make it go in a direction of the optical recording medium 10, and has characteristics of 5% of transmission and 95% of reflection of some linearly polarized light, and 100% of reflection of linearly polarized light which is orthogonal to the above-mentioned linearly polarized light.

The quarter wavelength plate 8 is formed with a birefringence material, and is an optical element which transforms linearly polarized light into circularly polarized light. The objective lens 9 is a lens which condenses light to a recording layer of the optical recording medium 10, and whose numerical aperture (NA) is 0.85. The condenser lens 11 is a lens which condenses light, reflected by the recording layer of the optical recording medium 10, to the photodetector 13.

The cylindrical lens 12 whose incident plane is a cylindrical face and whose outgoing plane is a rotationally symmetric face to a lens optical axis, provides the astigmatism of enabling detection of a focus error signal by a so-called astigmatism method to incident light.

The photodetector 13 receives light reflected by the recording layer of the optical recording medium 10, and converts the light into an electric signal.

The opening 16 for an objective lens is for restricting the size of light incident into the objective lens 9, and determining NA of the objective lens, and also serves as a member holding the objective lens 9. The actuator 17 performs focus control which is position control in a direction of an optical axis, and tracking control which is position control in a direction vertical to it, and is constituted of driving instrument such as a coil and a magnet. The driving instrument 18 drives the concave lens 6a in the direction of the optical axis.

The operation of the optical information apparatus constituted in this way will be explained. The linearly polarized light emitted from the laser 2 is divided into three beams by the diffraction grating 3, and this light divided into three beams is transformed into parallel light by the collimator lens 4. The light made into parallel light permeates the polarization beam splitter 5, and is incident into the lens group 6.

Here, in order to correct a spherical aberration generated by dispersion of protective layer thickness of the optical recording medium 10, the incident parallel light is transformed into divergent light or convergent light by changing the space between the concave lens 6a and convex lens 6b, which constitute the spherical aberration correction instrument 24, using the driving instrument 18, and this transformed light is incident into the mirror 7, its part penetrates, and most is reflected to be changed for its traveling direction toward the optical recording medium 10. This reflected light is incident into the quarter wavelength plate 8, the linearly polarized light is transformed into circularly polarized light, this circularly polarized light is limited for an opening by the opening 16 for an objective lens to be incident into the objective lens 9, generates a spherical aberration according to a divergent degree or a convergent degree of the incident light, and is condensed on the optical recording medium 10. Here, in order to correct the spherical aberration generated on the recording layer by the dispersion in the thickness of the protective layer of the optical recording medium 10, light which has a spherical aberration in a direction which cancels the spherical aberration resulting from the thickness of the protective layer is condensed by the objective lens 9, and hence, a light spot which has no aberration, that is, which is stopped down to a diffraction limit is formed on the recording layer of the optical recording medium 10.

Next, the circularly polarized light reflected from the optical recording medium 10 is incident into the quarter wavelength plate 8 to be transformed into linearly polarized light in a direction orthogonal to the linearly polarized light which is emitted from the laser 2. The linearly polarized light transformed by the quarter wavelength plate 8 is altogether reflected by the mirror 7, permeates the lens group 6, is reflected by the polarization beam splitter 5, is converged by the condenser lens 11 without returning to the laser 2, is given astigmatism by the cylindrical lens 12, and is condensed on the photodetector 13. The photodetector 13 transforms the received light beam into an electric signal. This electric signal is supplied to the focus control instrument 19, tracking control instrument 20, and reproduced signal processing instrument 102.

The focus control instrument 19 obtains a focus error signal from the signal supplied from the photodetector 13, and performs focus control, which is position control in the direction of the optical axis, using the actuator 17 according to this focus error signal. The tracking control instrument 20 obtains a tracking error signal from the signal supplied from the photodetector 13, and performs tracking control using the actuator 17 according to this tracking error signal so that the light beam may get on-track in a predetermined area on the optical recording medium 10. In addition, the focus error signal and tracking error signal are detected by widely known technology, for example, an astigmatism method and a three-beam method.

A reproduced signal according to recording information recorded on the optical recording medium 10 is supplied to the reproduced signal processing instrument 102. The reproduced signal processing instrument 102 performs processing such as waveform equalization to this reproduced signal, and outputs the reproduced data as digital data.

Here, it will be described in detail that spherical aberration correction becomes possible using the spherical aberration correction instrument 24. When the space between the concave lens 6a and convex lens 6b which constitute the spherical aberration correction instrument 24 is narrowed, parallel light is transformed into divergent light, and when the space is enlarged, it is transformed into convergent light. That is, it is possible to generate light, which has a divergent/convergent angle with a different positive/negative sign on the basis of parallel light, by freely changing the divergent angle of light outputted from the spherical aberration correction instrument 24 by changing the space between the concave lens 6a and convex lens group 6b. Here, when divergent light or convergent light, i.e., non parallel light which has an elevation angle or an depression angle to the optical axis is incident into the objective lens 9, a spherical aberration arises in the light stopped down by the objective lens 9, and its size and direction depend on an angle of incident divergent light/convergence light (an elevation angle/depression angle), and hence, it becomes possible to correct the spherical aberration, generated by the base material thickness dispersion of the optical recording medium 10 or the like, by using this spherical aberration.

On the other hand, in an optical information apparatus, in order to perform suitable reproduction or record, it is necessary to perform control such as optimization of laser power irradiated on the optical recording medium 10. Then, luminous intensity taken out in an arbitrary location of an optical system from the laser to the objective lens is measured, and feedback control which controls largeness of an output of laser power is performed on the basis of the luminous intensity.

Nevertheless, when it is attempted to perform feedback control of laser power in the optical information apparatus with such structure as shown in the above-mentioned FIG. 12, the following malfunctions are supposed.

FIG. 13 is a diagram showing structure of performing feedback control of laser power in the optical information apparatus equipped with the above-mentioned spherical aberration correction instrument 24.

In FIG. 13, a lens 14 condenses light, permeating the mirror 7, to a light quantity detector 15. The light quantity detector 15 transforms the received light beam into an electric signal. In addition, an opening 14a for a lens adjusts the light incident into the lens 14. Furthermore, in the optical system, the opening 14a for a lens, lens 14, and light quantity detector are made to use one side of light at the time of being branched by the mirror 7 after passing the spherical aberration correction instrument 24.

In such structure, the light which permeates the mirror 7 is condensed to the light quantity detector 15 by the lens 14 through the opening 14a for a lens, and the light quantity detector 15 transforms the received light beam into an electric signal. This electric signal is a signal (outgoing power detection signal a) of monitoring the outgoing power of the laser 2, and is inputted into the laser power control instrument 21. On the other hand, the controller 103 sets the outgoing power of the laser optimum for reproduction or record, and it is inputted into the laser power control instrument 21 as a reference voltage signal b. The laser power control instrument 21 controls an amount of a laser driving current supplied to the laser 2 so that the outgoing power detection signal a and reference voltage signal b may become equal. Thereby, the outgoing power of the laser 2 is controlled at predetermined power in any case of reproduction and record.

Nevertheless, in the above-mentioned structure, the following malfunctions are supposed. Hereafter, explanation will be performed using FIG. 14. FIG. 14 is a diagram showing schematically light which is incident into the objective lens 9 when the driving instrument 18 drives the concave lens 6a to correct a spherical aberration. In FIG. 14, when a protective layer of the optical recording medium 10 is thick, the space between the concave lens 6a and convex lens 6b of the spherical aberration correction instrument 24 becomes large so as to cancel the spherical aberration accompanying this thickness, and hence, the light which is reflected by the mirror 7 is incident into the objective lens 9 in convergent light. Continuous lines show this state.

In addition, when the protective layer thickness of the optical recording medium 10 is thin, on the contrary to the above-mentioned case, the space between the concave lens 6a and convex lens 6b becomes narrow, and the light reflected by the mirror 7 is incident into the objective lens 9 in divergent light. The dotted lines show this state.

In the above structure, when the concave lens 6a moves so as to correct the spherical aberration of the optical recording medium 10, it is necessary to make the quantity of light incident into the objective lens 9 constant in its moving range, that is, regardless of a location of the concave lens 6a. That is, it is necessary to prevent leakage light, which is not irradiated on the objective lens 9 as shown in dotted and dashed lines in FIG. 14, from arising. For that purpose, it is necessary to design beforehand optical arrangement of the concave lens 6a and convex lens 6b in the spherical aberration correction instrument 24, the quarter wavelength plate 8, objective lens 9, and the like.

Nevertheless, in the structure shown in FIG. 13, the above consideration has not been given about the structure in a side of the light quantity detector 15. In this case, the following situations arise.

Namely, supposing that the opening 14a for a lens, that is, light used for the light quantity detector 15 is in a position A shown in FIG. 14, light quantity incident into the light quantity detector 15 (area of a substantial light-receptive region) varies according to a position of the concave lens 6a since shading and the like arise as shown by optical paths by continuous lines and optical paths by dotted lines which are in the figure. That is, although the outgoing power of the laser 2 does not change, since a cross-sectional area of a light beam to a side of the light quantity detector 15 changes by the correction of the spherical aberration correction instrument 24, the incident light quantity to the light quantity detector 15 changes.

For this reason, for example, as shown in FIG. 15, even if the outgoing power of an objective lens output is made constant, an output level (outgoing power detection signal a) of the light quantity detector 15 changes to Vdet1 to Vdet2 (Vdet2>Vdet1) according to the spherical aberration correction amount SA1 to SA2. Here, since the laser power control instrument 21 performs becomes control so that this outgoing power detection signal a becomes equal to the reference voltage signal b, when laser power control is performed in this state, the outgoing power of the objective lens output changes according to the spherical aberration correction amount.

Thus, since a signal level detected by the light quantity detector 15 becomes small when the spherical aberration correction amount is SA1, it is controlled so that the outgoing power of the laser 2 may become large. At this time, while reproducing the optical recording medium 10, power more than needed is irradiated on the optical recording medium 10, and there is a possibility of accidentally degrading recorded information recorded on the optical recording medium 10. In addition, on the contrary, since the signal level detected by the light quantity detector 15 becomes large when the spherical aberration correction amount is SA2, it is controlled so that the outgoing power of the laser 2 may become small. At this time, while reproducing the optical recording medium 10, reproductive signal quality deteriorates, and there is a possibility that it may become impossible to reproduce recording information.

As opposed to such a malfunction, what is conceivable is such a measure of designing an optical system so as to be able to secure fixed light quantity also in a side of the light quantity detector 15 similarly to the side of the objective lens 9, or providing the optical detector 15 in a position where it can receive directly light which is not affected by the spherical aberration correction instrument 24, for example, light having passed the polarization beam splitter 5.

Nevertheless, the former measure imposes severe optical conditions in a design of the optical head 1 to both of designs of sides of the objective lens 9 and optical detector 15, and hence, itself is reflected in manufacturing cost. Furthermore, optimal size of satisfying both optical conditions is enlarged and when it cannot be obtained within, for example, the designed size of a conventional light head, a malfunction that a new parts design must be performed is caused. The same problem arises also in the latter.

In addition, the problem mentioned above arises similarly, when correcting a spherical aberration by moving a collimator lens in the direction of the optical axis.

Then, the present invention is proposed in view of the above-described actual conditions, and provides an optical information apparatus which not only can respond to dispersion in thickness of a protective layer of an optical recording medium without depending on optical conditions in a design, but also can keep outgoing power of an objective lens output constant, and a laser power setting method comprising such an optical information apparatus.

DISCLOSURE OF THE INVENTION

In order to solve the above problem, a first aspect of the present invention is an optical information apparatus, comprising:

a laser light source which emits a light beam;

alight beam convergence system which has an objective lens which converges a light beam emitted from said laser light source on an optical recording medium;

spherical aberration correction instrument which is arranged on an optical axis of said light beam which links said laser light source and said objective lens, and corrects a spherical aberration generated on said optical recording medium;

light separating instrument which separates into plural beams a light beam emitted from said laser light source;

light quantity detection instrument which receives either light beam separated by said light separating instrument, and outputting an electric signal according to an amount of received light;

laser power control instrument which controls outgoing power of said laser light source on the basis of said electric signal of said light quantity detection instrument; and laser power correction instrument which performs such correction that the outgoing power of said laser light source changes according to a correction amount of the spherical aberration on the basis of a relationship between an outgoing power of a light beam emitted from said objective lens and an amplitude of the electric signal which said light quantity detection instrument outputs, said correction amount provided to said aberration correction instrument to correct said spherical aberration.

A second aspect of the present invention is the optical information apparatus according to the first aspect of the present invention, wherein said laser power correction instrument changes a target control signal which the laser power control instrument uses according to said correction amount of the spherical aberration.

A third aspect of the present invention is the optical information apparatus according to the first aspect of the present invention, wherein said laser power correction instrument changes the outgoing power of said laser light source by control of said laser power control instrument by correcting said electric signal obtained in said light quantity detection instrument according to said correction amount of said spherical aberration.

A fourth aspect of the present invention is the optical information apparatus according to the first aspect of the present invention, wherein said light separating instrument is provided so that said light quantity detection instrument receives light passed said spherical aberration correction instrument.

A fifth aspect of the present invention is the optical information apparatus according to the first aspect of the present invention, wherein said light separating instrument is provided so that said light quantity detection instrument receives light before passing through said spherical aberration correction instrument.

A sixth aspect of the present invention is the optical information apparatus according to the first aspect of the present invention, comprising a memory instrument which stores said relationship between the outgoing power of the light beam emitted from said objective lens and the amplitude of the electric signal, output by said light quantity detection instrument.

A seventh aspect of the present invention is the optical information apparatus according to the sixth aspect of the present invention, wherein said memory instrument is a non-volatile memory.

An eighth aspect of the present invention is the optical information apparatus according to any one of the first to the third aspects of the present invention, wherein said laser power correction instrument performs a preliminary correction, which changes said outgoing power by a predetermined amount, before said correction.

A ninth aspect of the present invention is the optical information apparatus according to the eighth aspect of the present invention, wherein said laser power correction instrument performs said preliminary correction before a focal position of said objective lens migrates between recording layers, when said optical information apparatus performs record or reproduction of information to a multilayer optical recording medium which has a plurality of recording layers as an optical recording medium.

A tenth aspect of the present invention is the optical information apparatus according to the ninth aspect of the present invention, wherein said laser power correction instrument performs said preliminary correction so as to decrease said outgoing power by said predetermined amount as distance between said recording layer which corresponds to a focal position of said objective lens and said objective lens becomes large.

An eleventh aspect of the present invention is the optical information apparatus according to the ninth aspect of the present invention, wherein said laser power correction instrument performs the correction of said outgoing power according to said correction amount of said spherical aberration after the focal point migration of said recording layer is complete after performing said preliminary correction of said outgoing power according to a position of said recording layer.

A twelfth aspect of the present invention is the optical information apparatus according to the first aspect of the present invention, wherein at least said laser power control instrument and said laser power correction instrument are constituted integrally on an integrated circuit.

A thirteenth aspect of the present invention is an information processing apparatus, comprising the optical information apparatus according to the first aspect of the present invention, wherein information, recorded or reproduced, from said optical recording medium is processed.

A fourteenth aspect of the present invention is a control method of an optical information apparatus, comprising a laser light source which emits a light beam, a light beam convergence system which has an objective lens which converges a light beam emitted from said laser light source on an optical recording medium, spherical aberration correction instrument which is arranged on an optical axis of said light beam which links said laser light source and said objective lens, and corrects a spherical aberration generated on said optical recording medium, light separating instrument which separates into plural beams a light beam emitted from said laser light source, light quantity detection instrument which receives either light beam separated by said light separating instrument, and outputting an electric signal according to an amount of received light, and laser power control instrument which controls outgoing power of said laser light source on the basis of said electric signal of said light quantity detection instrument, the control method comprising, a laser power correction step of performing such correction that the outgoing power of said laser light source changes according to a correction amount of said spherical aberration on the basis of a relationship between an outgoing power of a light beam emitted from said objective lens, and an amplitude of the electric signal which said light quantity detection instrument outputs, said correction amount provided to said aberration correction instrument to correct the spherical aberration.

A fifteenth aspect of the present invention is a program of making a computer function, in the control method of an optical information apparatus according to the fourteenth aspect of the present invention, as a laser power correction step of performing such correction that outgoing power of said laser light source changes according to said correction amount of said spherical aberration on the basis of relations between the outgoing power of a light beam emitted from said objective lens, and amplitude of an electric signal which said light quantity detection instrument outputs to the correction amount of a spherical aberration by said aberration correction instrument.

A sixteenth aspect of the present invention is a recording medium which records the program according to the fifteenth aspect of the present invention and can be processed by a computer.

Since it becomes possible in the present invention not only to respond to dispersion in thickness of a protective layer of an optical recording medium without depending on optical conditions in a design of an optical head, but also to keep outgoing power of an output to a side of an objective lens constant, it becomes possible to achieve an optical information apparatus which can obtain a stable control signal and a stable reproductive signal regardless of the thickness dispersion of the protective layer of the optical recording medium.

In addition, it becomes possible in the present invention to achieve an optical information apparatus where stable migration between recording layers becomes possible without a possibility of degrading accidentally the recorded information, recorded on the optical recording medium, being radiated at the power more than needed during reproduction by performing the setting at a spherical aberration correction amount suitable for a recording layer to be newly focused after lowering the outgoing power of an objective lens output beforehand.

DESCRIPTION OF SYMBOLS

Figure 1:
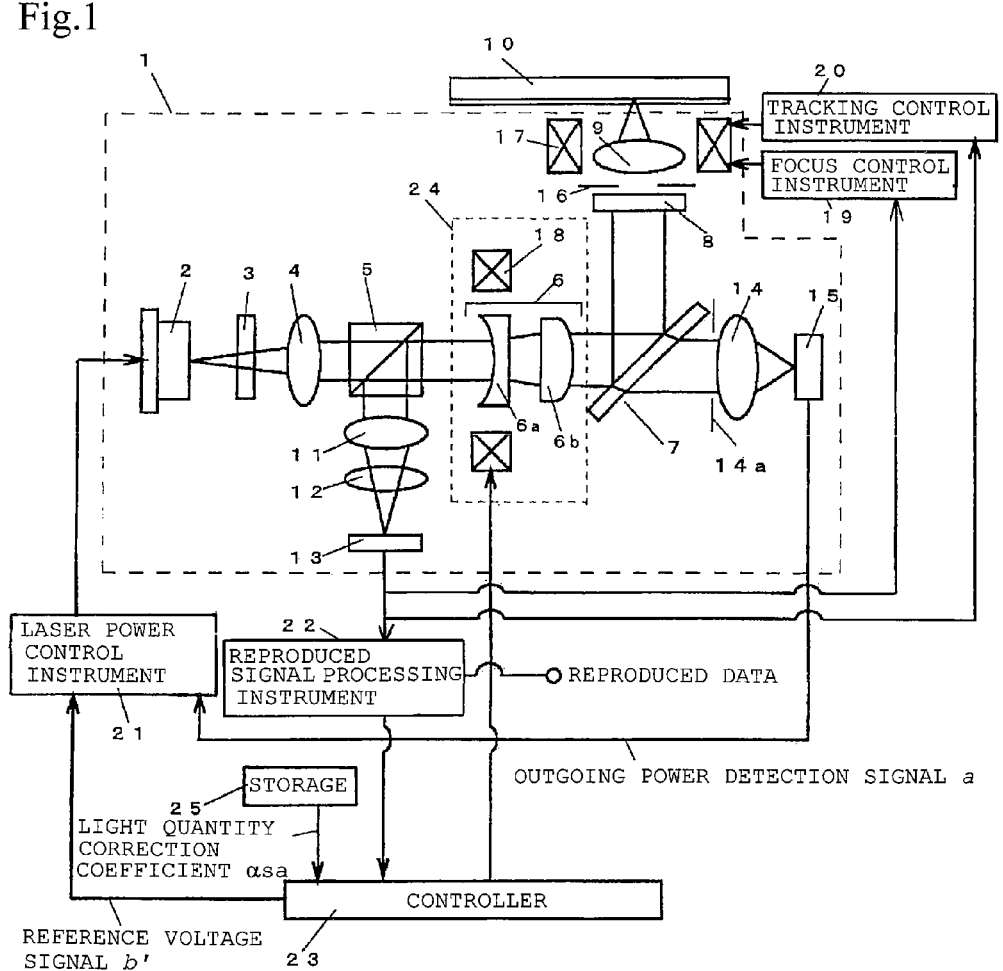
FIG. 1 is a schematic diagram of an optical information apparatus according to a first embodiment of the present invention.

1 Optical Head
2 Laser
3 Diffraction Grating
4 Collimator Lens
5 Polarization Beam Splitter
6 Lens Unit
6a Concave lens
6b Convex lens
7 Mirror
8 Quarter Wave Plate
9 Objective Lens
10, 40 Optical recording media
11 Condenser Lens
12 Cylindrical Lens
13 Photodetector
14 Lens
14a Opening for a lens
15 Light Intensity Detector
16 Opening for Objective Lenses
17 Actuator
18 Driving Instrument
19 Focus Control Instrument
20 Tracking Control Instrument
21 Laser Power Control Instrument
22, 102 Reproduced signal processing instrument
23, 53, 103 Controllers
24 Spherical Aberration Correction Instrument
25 Storage
45 Beam splitter
61 First Substrate
62 Second Substrate
63 Voltage Application Electrode
64 Opposite Electrode
65 and 66 Transparent resin membranes
67 Liquid Crystal
68 Sealing Resin
82 Protective Layer
83 First Recording Layer
84 Second Recording Layer
85 Interlayer
86 Base Material Layer
87 Surface

BEST MODE FOR CARRYING OUT THE INVENTION

Hereafter, specific embodiments of the present invention will be described in detail with referring to drawings.

Embodiment 1

FIG. 1 is a schematic diagram of an optical information apparatus in a first embodiment. In FIG. 1, the same reference numerals are used for the same constituents as those in FIG. 13, and their detailed description is omitted.

In FIG. 1, reference numeral 14 denotes a lens which condenses light, permeating the mirror 7, to the light quantity detector 15, reference numeral 15 denotes the light quantity detector which transforms a received light beam into an electric signal, and light quantity detection instrument is constituted of the lens 14 and light quantity detector 15. In addition, reference numeral 22 denotes reproduced signal processing instrument, reference numeral 23 denotes a controller, and reference numeral 25 denotes storage.

A light beam received by the photodetector 13 is transformed into an electric signal, which is supplied to the focus control instrument 19, tracking control instrument 20, and reproductive signal processing instrument 22.

A reproduced signal according to recording information recorded on the optical recording medium 10 is supplied to the reproduced signal processing instrument 22. The reproduced signal processing instrument 22 performs processing of waveform equalization and the like to this reproduced signal and outputs the reproduced data as digital data, and further, inputs information about reproductive signal quality, for example, a modulation factor, a jitter value, or an error rate of the reproduced signal into the controller 23.

The controller 23 sets the outgoing power of the laser 2 optimum for reproduction or record, and inputs it into the laser power control instrument 21 as a reference voltage signal b', and further, controls the spherical aberration correction instrument 24. In addition, the controller 23 includes laser power setting instrument. The spherical aberration correction instrument 24 corrects a spherical aberration by the designation of the controller 23 so that the spherical aberration in a recording layer of the optical recording medium 10 may become minimum. The storage 25 is implemented by non-volatile memory such as EPROM, and relation between the correction amount of the spherical aberration and the output level of the light quantity detector 15 by the spherical aberration correction instrument 24 is stored, for example, at the time of factory shipment.

In addition, in the above-mentioned structure, the laser 2 is equivalent to a laser light source of the present invention, and the diffraction grating 3, collimator lens 4, polarization beam splitter 5, mirror 7, quarter wavelength plate 8, opening 16 for an objective lens, and objective lens 9 constitute a light beam convergence system of the present invention. Furthermore, the spherical aberration correction instrument 24 is equivalent to spherical aberration correction instrument of the present invention, and the polarization beam splitter 5 is equivalent to light separating instrument of the present invention. Moreover, the light quantity detector 15 is equivalent to light quantity detection instrument of the present invention, the laser power control instrument 21 is equivalent to laser power control instrument of the present invention, and the controller 23 is equivalent to laser power correction instrument of the present invention. In addition, the storage 25 is equivalent to memory instrument of the present invention. These correspondences are the same also in the following embodiments. Furthermore, so long as the structure has the objective lens 9 and is able to converge a light beam emitted from the laser 2 on the optical recording medium 10, the light beam convergence system of the present invention is not limited to the above-mentioned structure, but it is also sufficient to omit or substitute the lens and other optical components arbitrarily.

Figure 2:
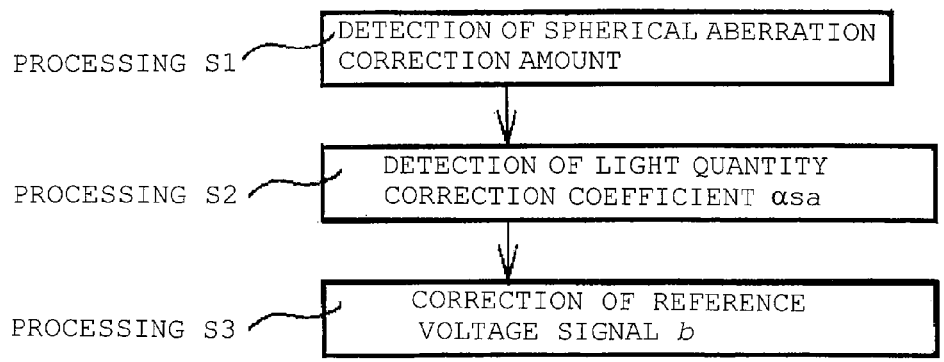
FIG. 2 is a flowchart showing decision procedure of a reference voltage signal b' according to the first embodiment of the present invention.

As for the optical information apparatus according to the first embodiment of the present invention constituted as described above, hereafter, while its operation will be explained using FIGS. 1 to 3, a control method of the optical information apparatus of the present invention will be explained thereby.

Figure 13:
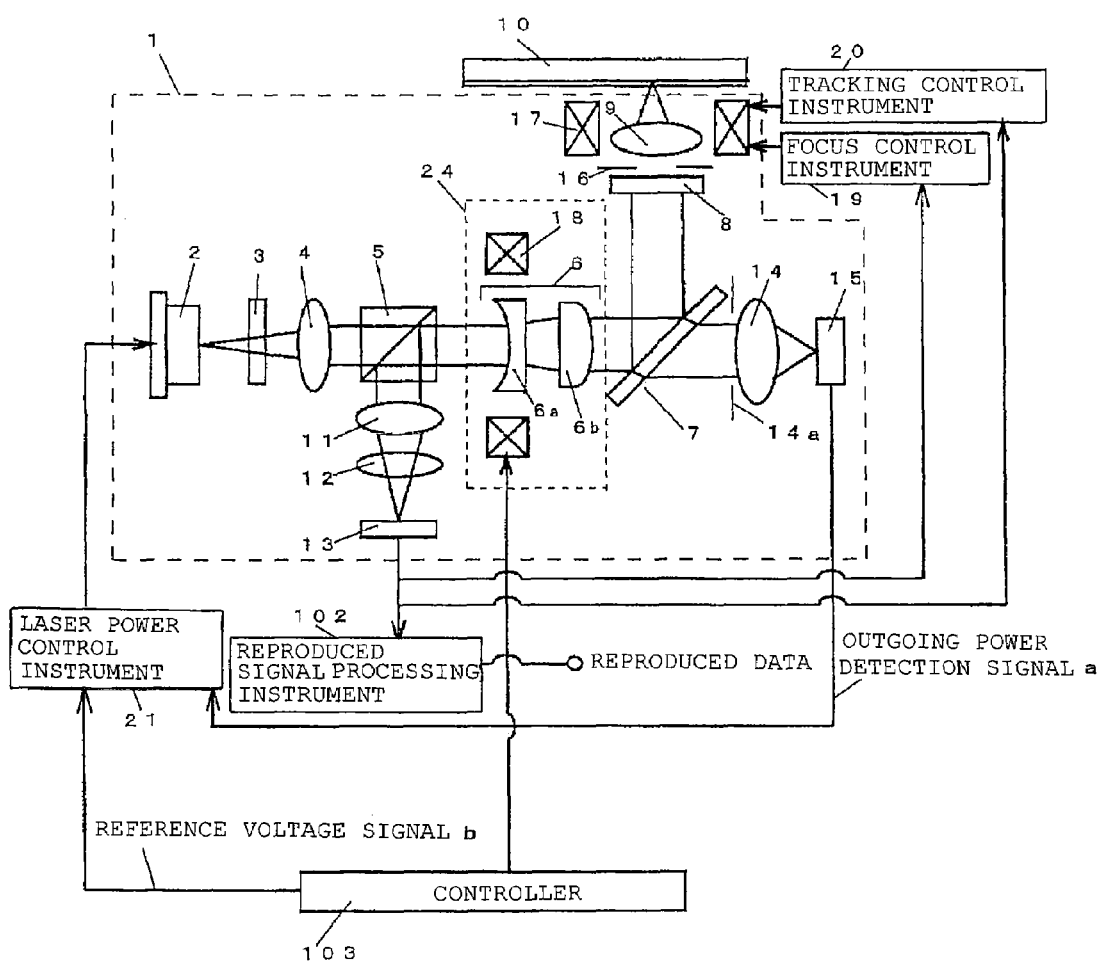
FIG. 13 is a diagram of explaining subjects to be solved by the invention.

Here, in the controller 23, it is a remarkable feature in this first embodiment to correct a value of the reference voltage signal b, equivalent to a target control signal of the present invention to obtain the reference voltage signal b' (correction of a set point of outgoing power of a laser beam set by the laser power control instrument 21) according to a spherical aberration correction amount by the spherical aberration correction instrument 24. That is, a signal level detected by the light quantity detector 15 according to an amount of the spherical aberration (hereafter, a spherical aberration correction amount) corrected by the spherical aberration correction instrument 24 was changed in the structure of performing simultaneously feedback control of laser power and spherical aberration correction by the spherical aberration correction instrument 24 as shown in FIG. 13. Since the output power of light toward the objective lens 9 side is constant, it is possible to calculate back a change of the signal detected by the light quantity detector 15 from the spherical aberration correction amount. This embodiment obtains a changed portion of the detection signal of the light quantity detector 15 from the spherical aberration correction amount using this to thereby correct the detection signal of the light quantity detector 15.

Thereinafter, an example of specific operation will be described with reference to FIG. 2. In addition, FIG. 2 is a flowchart showing an example of decision procedure of the reference voltage signal b' in the controller 23.

The controller 23 detects a spherical aberration correction amount in advance of the setting of the reference voltage signal b' (step S1). When the spherical aberration correction instrument 24 is constituted of an actuator, the spherical aberration correction amount can be detected from a drive current of the actuator. In addition, when the spherical aberration correction instrument 24 is constituted of a stepping motor, it can be detected from the number of steps from a reference position. Furthermore, it is also sufficient to determine the spherical aberration correction amount optimum for a recording layer of the optical recording medium 10 by predetermined study, for example, at the starting time of the optical information apparatus. More specifically, it reproduces the recorded information recorded on the optical recording medium 10 while changing the spherical aberration correction amount by the spherical aberration correction instrument 24 according to the designation from the controller 23 at the starting time of the optical information apparatus, and can decide the spherical surface correction aberration amount, which makes reproductive signal quality optimum on the basis of information such as jitter obtained then from the reproductive signal processing instrument 22. Thereby, it becomes possible to determine the spherical aberration correction amount optimum for the recording layer which performs record and/or reproduction of information. In addition, also in this case, it is possible to detect the spherical aberration correction amount from the drive current of the actuator or the number of steps from the reference position.

Next, the controller 23 detects a light quantity correction coefficient, corresponding to the spherical aberration correction amount obtained at step S1, from the storage 25 (step S2).

Figures 3A, 3B:
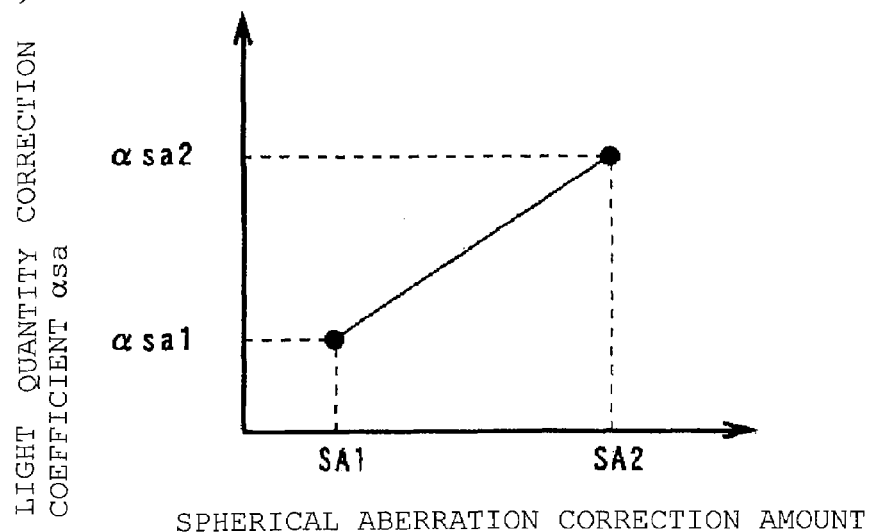
FIG. 3(a) is a graph showing relation between the light quantity correction coefficient and the spherical aberration correction amount according to the first embodiment of the present invention.
FIG. 3(b) is a drawing showing a table of the relation between the light quantity correction coefficient and the spherical aberration correction amount according to the first embodiment of the present invention.
Figure 14:
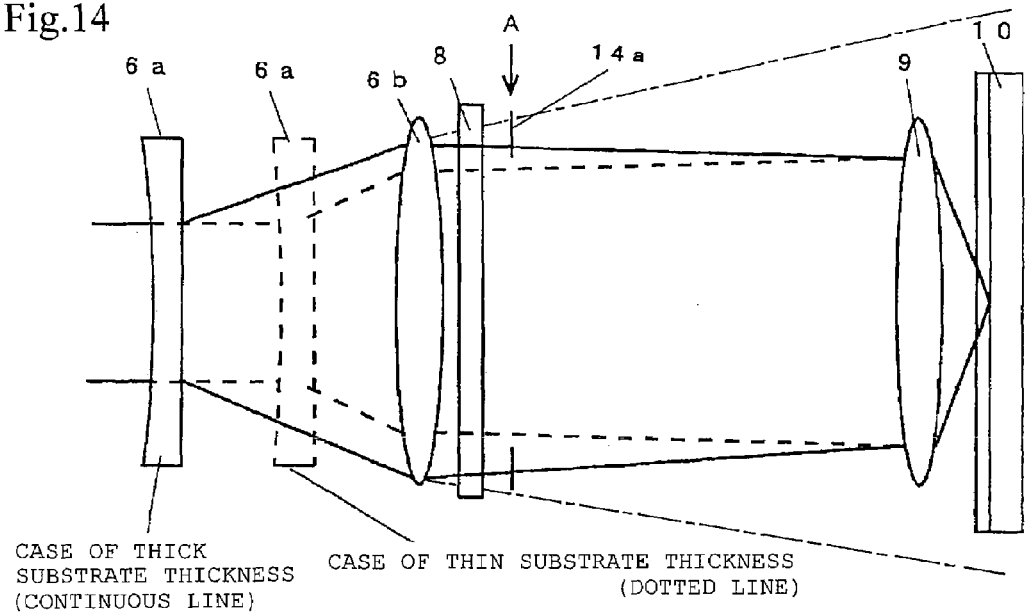
FIG. 14 is a schematic diagram showing light incident into a side of an objective lens 9 at the time of correcting a spherical aberration.
Figure 15:
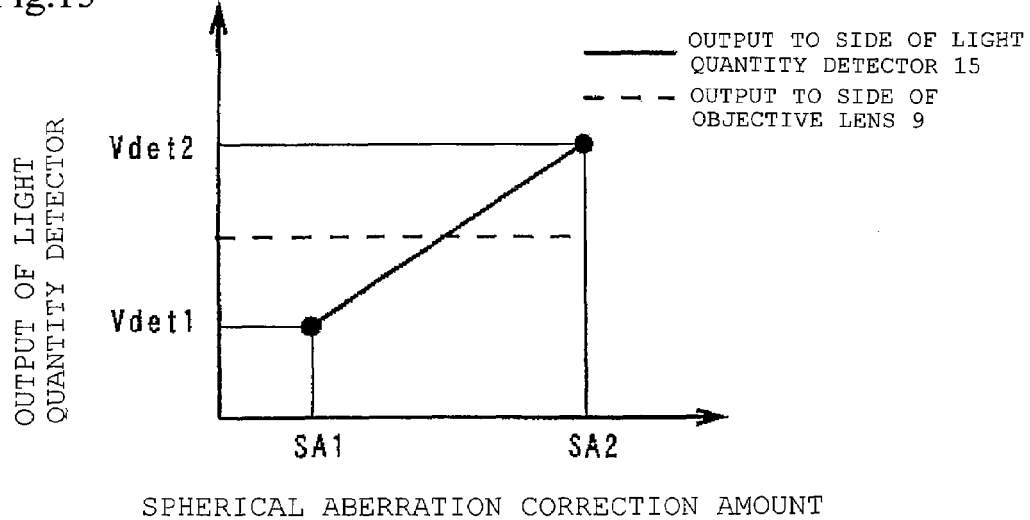
FIG. 15 is a graph showing relation between the spherical aberration correction amount and the signal level detected by the light quantity detector 15.

As described in the section of Problems to be Solved by the Invention, in the optical information apparatus using the spherical aberration correction instrument 24 which forms divergent light or convergent light and corrects a spherical aberration, as shown in FIG. 14, even if it is designed so that the light quantity of an output in the side of the objective lens 9 may become constant, unless a side of the photodetection apparatus 15 is designed in consideration of an influence of shading and the like, an output level of the light quantity detector 15 (outgoing power detection signal a) changes up to from Vdet1 to Vdet2 (Vdet2>Vdet1) according to the spherical aberration correction amounts SA1 to SA2. Then, the storage 25 is made to store a light quantity correction coefficient αsa according to the spherical aberration correction amount, for example, at the time of factory shipment, as shown in FIG. 3(a). For example, let a light intensity correction coefficient (αsa1) in the case of a spherical aberration correction amount being SA1 be 1, and let the light intensity correction coefficient in the case of the spherical aberration correction amount being SA2 be αsa2, and a value of Vdet2/Vdet1 is stored (αsa2=Vdet2/Vdet1>1). In addition, the number of combinations of the spherical aberration correction amount SAn, and the light quantity correction coefficient αsan, stored in the storage 25 may be two, or may be three or more as shown in FIG. 3 (b).

At step S2, when, for example, the light quantity correction coefficient αsa is obtained by calculation, according to the spherical aberration correction amount obtained at step S1 and the obtained spherical aberration correction amount is SAz (SA1<SAz<SA2), the light quantity correction coefficient αsaz is obtained by the following formula.

(Formula 1)

$$\alpha saz=(Vdet2/Vdet1-1)/(SA2-SA1)\times(SAz-SA1)+1 \quad \text{(formula 1)}$$

In addition, the detection of a light quantity correction coefficient is not limited to the method of obtaining it by calculation shown in formula 1, but it is also sufficient to use the light quantity correction coefficient according to the spherical aberration correction amount nearest to the spherical aberration correction amount SAz obtained at step S1 in the case that the light quantity correction coefficients αsa to a plurality of spherical aberration correction amounts as shown in FIG. 3(b) are stored in the storage 25.

Next, using the light quantity correction coefficient αsa detected at step S2, the controller 23 performs correction of the reference voltage signal b in accordance with the following formula, and inputs the reference voltage signal b' after correction into the laser power control instrument 21 (step S3).

$$b'=b \times \alpha sa \quad \text{(formula 2)}$$

Heretofore, since a signal level detected by the light quantity detector 15 became large in comparison with the case that the spherical aberration correction amount was SA1 when the spherical aberration correction amount was SA2, it was controlled so that the outgoing power of the laser 2 might become small. Nevertheless, as shown in formula 2, by making a value of the reference voltage signal b' set by the controller 23 variable according to a fluctuation amount of an output level of the light quantity detector 15 (Vdet2/Vdet1 when the spherical aberration correction amount is SA2) as shown in formula 2 (b'=b×αsa2=b×Vdet2/Vdet1 when the spherical aberration correction amount is SA2), it becomes possible to correct a changed portion of the output level of the light quantity detector 15.

Thus, according to this first embodiment, in the structure of using light outgoing from the spherical aberration correction instrument 24 in both of the side of the objective lens 9 for information record and reproduction and the light quantity detector 15 for laser power feedback control, it becomes possible to control laser power by a suitable value by correcting the reference voltage signal according to the spherical aberration correction amount even when it is designed regardless of optical conditions, such as shading, to the side of the light quantity detector 15. In addition, in the above-mentioned explanation, the reference voltage signal b' is equivalent to a control signal which the laser power control instrument of the present invention uses.

Furthermore, even if the light quantity detector 15 satisfies optical conditions, this embodiment operates normally and the light quantity correction coefficient αsa at this time is set in αsa=1. This means the following. That is, so long as it is designed so that the light quantity of light which is incident into the side of the objective lens 9 may become constant, the optical information apparatus of this first embodiment can perform always normal control operation regardless of propriety of an optical design in the side of the light quantity detector 15.

Thereby, since it is possible to reconcile the spherical aberration correction and laser power feedback using a design of the conventional light head 1 as it is, it is possible to prevent a new design, upsizing, or the like of an apparatus.

In addition, although the method of correcting a setting value of the reference voltage signal b outputted from the side of the controller 23 as a target control signal of the present invention was explained according to a spherical aberration correction amount in this first embodiment, it is not limited to this, but it is also sufficient to correct the outgoing power detection signal a. At this time, as for the correction of the outgoing power detection signal a by the light quantity correction coefficient αsa, it is also sufficient to provide separately correction instrument linked to the storage 25 on a path from the light quantity detector 15 to the laser power control instrument 21. Furthermore, it is also sufficient that the laser power control instrument 21 may obtain the light quantity correction coefficient (sa from the storage 25 and may correct it.

Moreover, although the case that the outgoing power of an output to the side of the objective lens 9 was constant according to spherical aberration correction amount, and the relation between the spherical aberration correction amount and the output level of the light quantity detector 15 was stored in the storage 25 was explained in this first embodiment, it is not limit to this, but it is also sufficient that the outgoing power of an output of the side of the objective lens 9 may change according to the spherical aberration correction amount, and in this case, for example, fluctuation amounts of ratios of outgoing power of the output in the side of the objective lens 9 and the output level of the light quantity detection unit 15 to the spherical aberration correction amount are stored in the storage 25.

In addition, although it was explained in this first embodiment that a series of operations of steps S1 to S3 were performed continuously, a spherical aberration correction amount was detected, the light quantity correction amount αsa was acquired, the reference voltage signal b was promptly corrected, and the reference voltage signal b' was obtained, the controller 23 may perform preliminary corrective operation, which changes the output power in the side of the objective lens 9, in advance of correction of the reference voltage signal b. This is for preventing the recorded information, which is recorded on the optical recording medium 10, from being degraded because a light beam with outgoing power more than needed is irradiated on the optical recording medium 10 leading to degrading the recorded information when there is a lag between the timing of spherical aberration correction, and the timing of correction of a reference voltage signal.

Specifically, before changing the spherical aberration correction amount, a reference voltage signal which is made smaller by a predetermined amount than the reference voltage signal b and makes outgoing power small is outputted to the laser power control instrument 21 beforehand. Outgoing power decreases by this control. Subsequently, steps S1 to S3 are executed, the reference voltage signal b' is outputted to the laser power control instrument 21 to correct the outgoing power properly.

Figure 4:
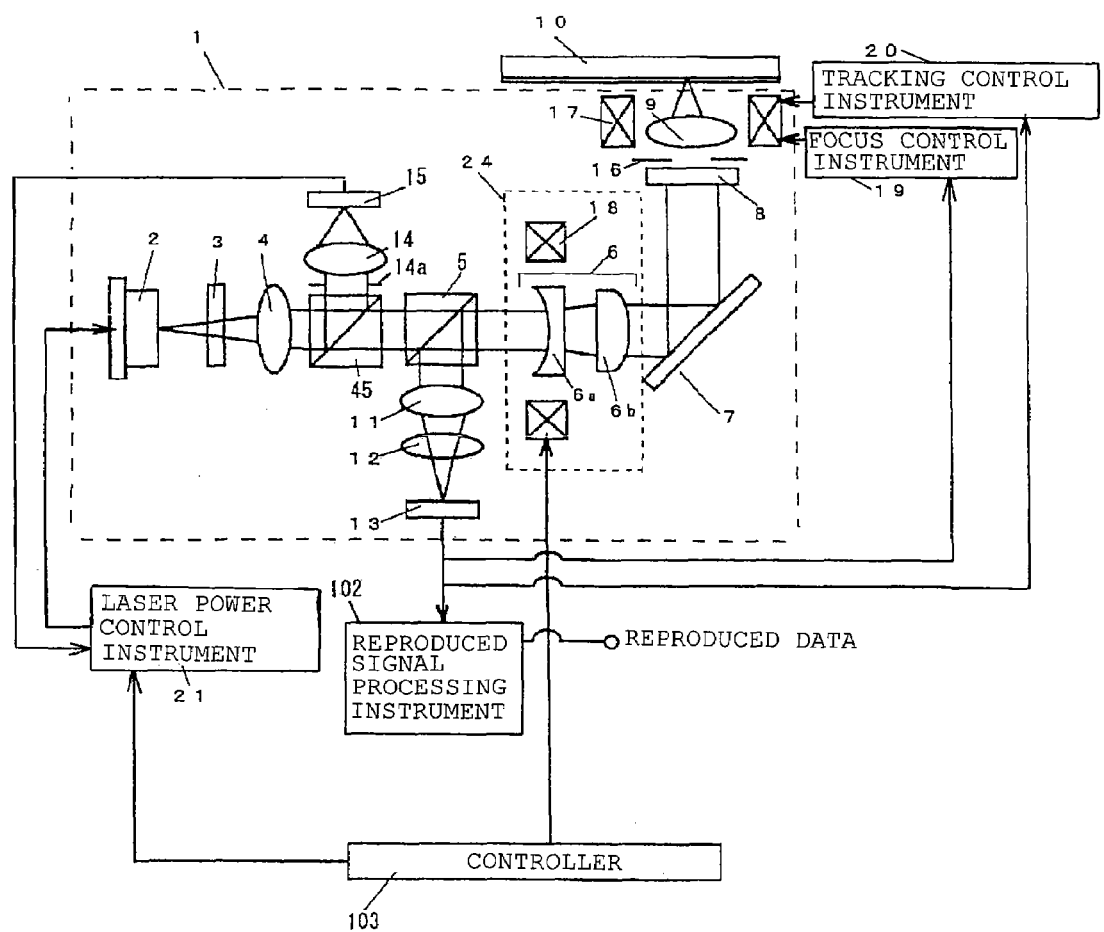
FIG. 4 is a schematic diagram showing another structural example of the optical information apparatus according to the first embodiment of the present invention.

In addition, although the case that the spherical aberration correction instrument 24 was arranged between the polarization beam splitter 5 and objective lens 9 was explained in this first embodiment, it is not limited to this, but it is also good to exist between the mirror 7 and objective lens 9. Furthermore, as shown in FIG. 4, it is also good to adopt the structure of newly providing a beam splitter 45 between the collimator lens 4 and polarization beam splitter 5 and arranging the light quantity detector 15 and the like so as to receive light branched from here.

In the above-mentioned structure, since the spherical aberration correction instrument 24 does not intervene in the side of the light quantity detector 15 while the light which passed the spherical aberration correction instrument 24 and becomes divergent light/convergent light is incident into the side of the objective lens 9, the light with fixed light quantity is always incident.

Also in this case, since fluctuation amounts of ratios of outgoing power (this is fixed) of an output in the side of the objective lens 9 and the output level of the light quantity detector 15 to the spherical aberration correction amount are stored in the storage 25, it becomes possible to keep the outgoing power of the output in the side of the objective lens 9 at a predetermined value by correcting it according to a spherical aberration correction amount, and by correcting the reference voltage signal b or outgoing power detection signal a is not performed even if the design that the side of the objective lens 9 receives fixed light quantity.

In short, when quantifying beforehand the relation between the outgoing power of light emitted from the objective lens 9 and the amplitude of the electric signal, which the light quantity detector 15 outputs, to the spherical aberration correction amount, the present invention can be also implemented regardless of any optical conditions of the side of the objective lens 9 and the light quantity detector 15. That is, when at least one side of the outgoing power of light emitted from the objective lens 9 and the amplitude of the electric signal which the light quantity detector 15 outputs is constant, it is possible to make a correction on the basis of a change in another side to the spherical aberration correction amount. In addition, when both of the outgoing power of light emitted from the objective lens 9 and the amplitude of the electric signal which the light quantity detector 15 outputs are indefinite, it is possible to perform correction on the basis of changes of both sides to the spherical aberration correction amount.

In addition, although the method of determining an optimal spherical surface correction aberration amount, based on information such as jitter obtained from the reproductive signal processing instrument 22, in this first embodiment was explained, it is not limit to this, but it is also sufficient to determine it on the basis of the amplitude of a tracking error signal, or to determine it on the basis of the other information.

Figure 5:
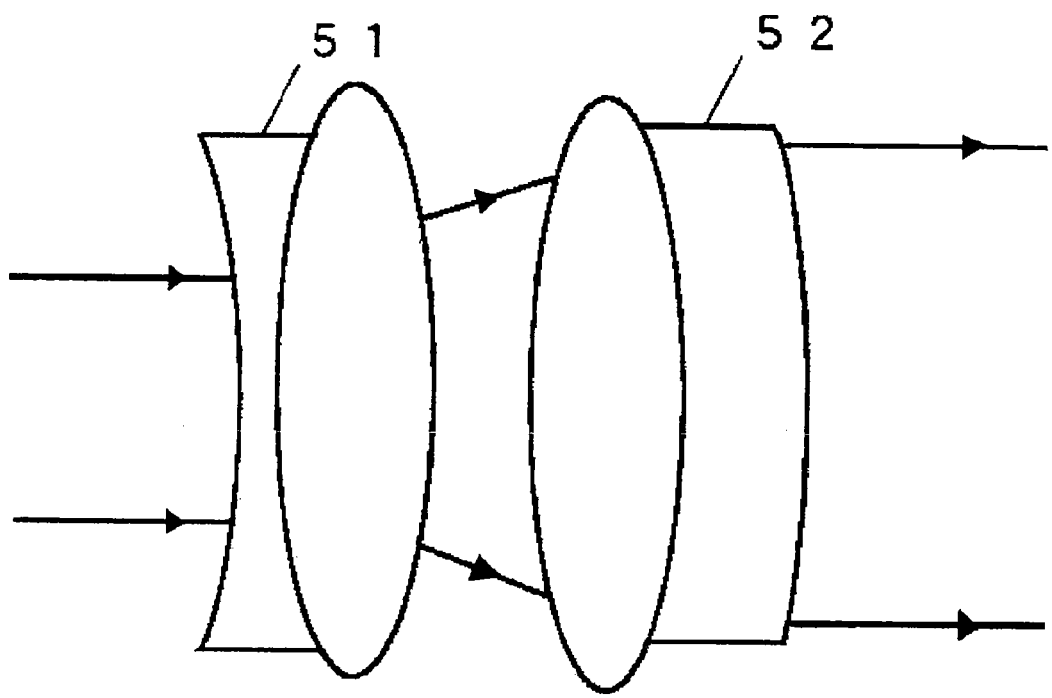
FIG. 5 is a structural diagram of spherical aberration correction instrument.

Furthermore, although the system of using the concave lens 6a and convex lens 6b as the spherical aberration correction instrument 24 is used in this first embodiment, it is also good to be a positive lens group and a negative lens group. The structural diagram of the spherical aberration correction instrument 24 (a one-axis actuator is not shown) which is constituted of a negative lens group 51 with a negative curvature, and a positive lens group 52 with a positive curvature is shown in FIG. 5. Since respective lens groups are constituted of transparent materials whose Abbe numbers differ, it is possible to constitute the spherical aberration correction instrument 24 which can correct a chromatic aberration generated by the lenses which form the optical head 1, especially the objective lens 9. Furthermore, since it is possible to correct a spherical aberration in an outward trip and a return trip in a system using lenses, it is possible to obtain a stable reproductive signal and a stable control signal.

Figure 6:
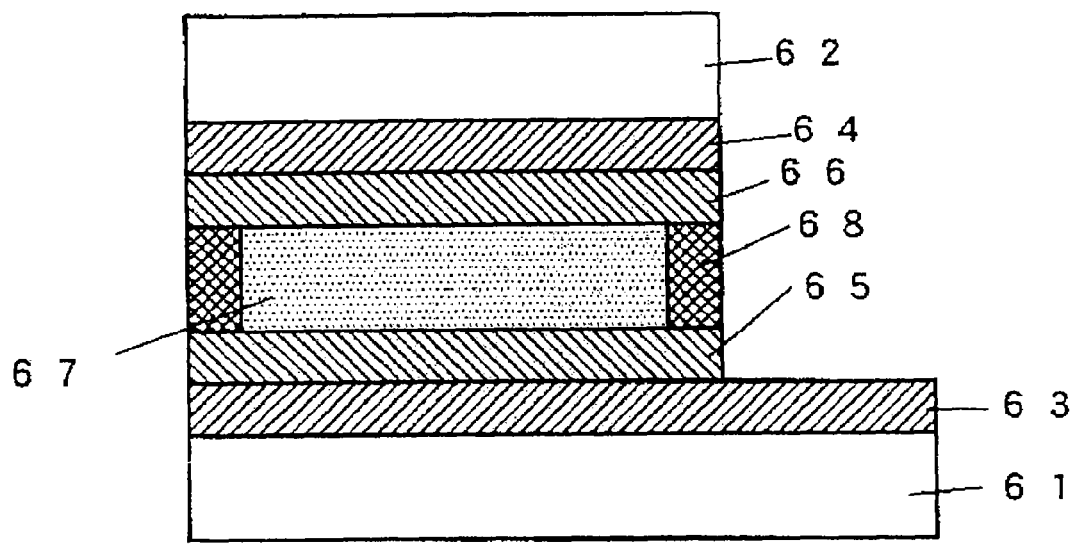
FIG. 6 is a sectional view of an optical element using liquid crystal as a phase changing layer as spherical aberration correction instrument.
Figure 7:
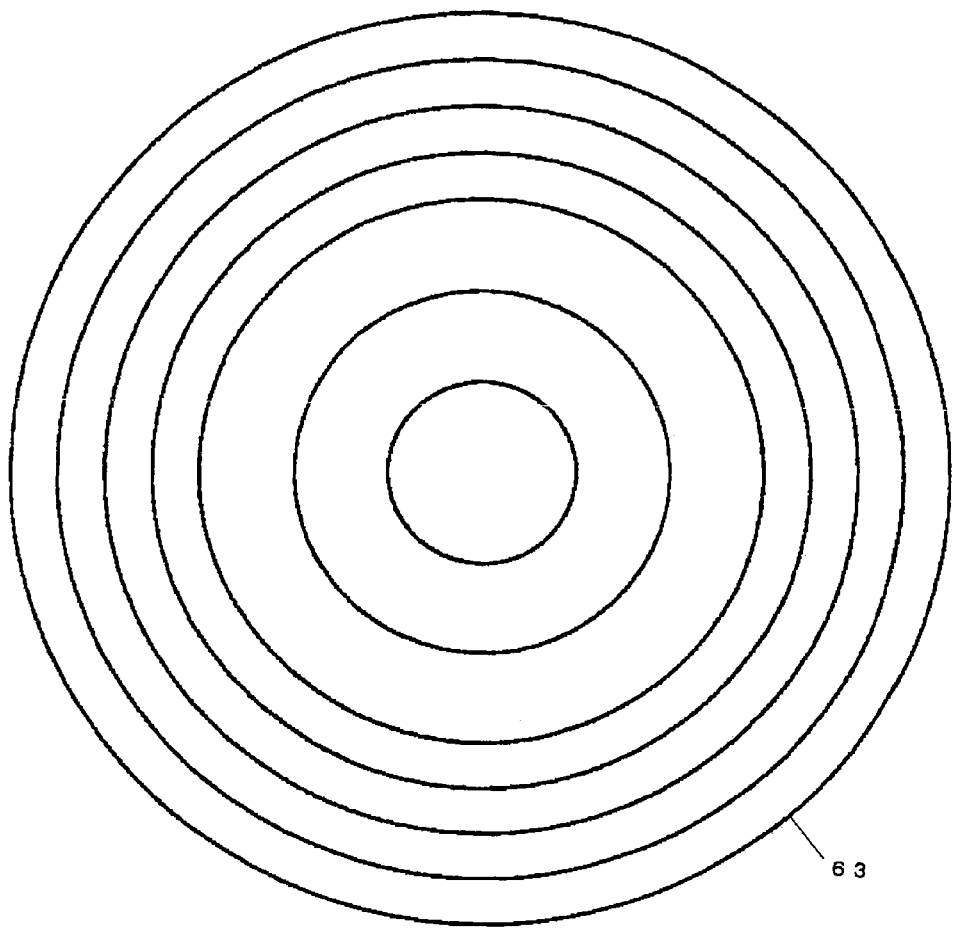
FIG. 7 is a drawing of a pattern used for an optical element.

In addition, the spherical aberration correction instrument 24 may be in the structure of not using a lens. For example, it is also sufficient that it is a system using a phase changing layer disclosed in Japanese Patent Application No. 2001-221927. An optical element used for this system will be described simply. FIG. 6 shows a sectional view of then optical element using liquid crystal as a phase changing layer, and FIG. 7 shows a drawing of a pattern used for the optical element, respectively. In FIG. 6, reference numeral 61 denotes a first substrate, reference numeral 62 denotes a second substrate arranged approximately in parallel to the first substrate 61, reference numeral 63 denotes a voltage application electrode arranged between the first substrate 61 and liquid crystal 67, reference numeral 64 denotes an opposite electrode arranged approximately in parallel to the voltage application electrode so as to face the voltage application electrode 63, reference numeral 65 denotes a transparent resin membrane formed so as to cover the voltage application electrode 63, reference numeral 66 denotes a transparent resin membrane formed so as to cover the opposite electrode 64, reference numeral 67 denotes liquid crystal arranged between the transparent resin membranes 65 and 66 (between the voltage application electrode 63 and opposite electrodes 64), and reference numeral 68 denotes a sealing resin arranged between the transparent resin membranes 65 and 66 so as to surround the liquid crystal 67. Here, the first substrate 61 and second substrate 62 are constituted of, for example, glass and are transparent. In addition, the voltage application electrode 63 is an electrode of applying a desired voltage to the liquid crystal 67. The voltage application electrode 63 is formed on a principal surface inside the first substrate 61 (a side of the liquid crystal 67). Furthermore, the opposite electrode 64 is an electrode of applying a desired voltage to the liquid crystal 67 with the voltage application electrode 63.

The opposite electrode 64 is formed on the principal plane inside the second substrate 62 (a side of the liquid crystal 67). The opposite electrode 64 is transparent, and is constituted of, for example, ITO. In addition, the opposite electrode 64 is formed approximately uniformly in at least a portion, which faces a segment electrode, in the principal plane inside the second substrate 62. In addition, the transparent resin membranes 65 and 66 are orientation membranes of making the liquid crystal 67 oriented in a predetermined direction, and are constituted of, for example, polyvinyl alcohol membranes. It is possible to orient the liquid crystal 67 in a predetermined direction by performing rubbing treatment of the transparent resin membrane 65 or 66. In addition, the liquid crystal 67 functions as a phase changing layer which changes a phase of incident light. The liquid crystal 67 is constituted of, for example, nematic liquid crystal. It is possible to change a refractive index of the liquid crystal 67 by changing a voltage difference between the voltage application electrode 63 and opposite electrode 64, and thereby, it is possible to change a phase of incident light. Moreover, the sealing resin 68 is for sealing the liquid crystal 67, and is constituted of, for example, an epoxy resin. In addition, the voltage application electrode 63 is constituted of concentric segment electrodes, as shown in FIG. 7. These segment electrodes are transparent, and are made of, for example, ITO. The operation of the optical element constituted in this way will be explained. It is made that a control voltage is applied to each of the segment electrodes of the voltage application electrode of the optical element from the external to give a phase of a curvature component to light which is incident into the optical element of the present invention In this manner, it becomes possible to transform an incident plane wave into a spherical wave, a spherical aberration is generated by this spherical wave being incident into the objective lens 9, and the spherical aberration generated when the thickness of the optical recording medium 10 deviates from the thickness of a designed protective layer is corrected by this spherical aberration. Here, although the liquid crystal whose refractive index changed according to a voltage as a phase changing layer was used, PLZT (transparent crystalline with perovskite structure including leadoxide, lanthanum, zirconium oxide, and titanium oxide) whose thickness (volume) changes according to a voltage may be used. Furthermore, since PLZT is a solid and neither a substrate nor a sealing resin is required like liquid crystal, it is possible to make the optical element thin. Since the method described in the first and second embodiments can correct an aberration caused by base material thickness of an optical recording medium naturally in an outward trip, but also in a return trip since it is constituted of lenses, it is possible to obtain a stable control signal. In addition, since the system described here corrects an aberration caused by base material thickness of an optical recording medium in the optical element which uses a phase changing layer, it is fit for miniaturization of the optical head 1. In addition, since the both of the lens system and the system using the above-mentioned phase changing layer correct a spherical aberration using convergent light and divergent light, even if the objective lens 9 performs a lens shift, spherical aberration correction performance does not deteriorate.

In addition, although the spherical aberration correction instrument 24 is constituted of the concave lens 6a, convex lens 6b and the driving instrument 18 which becomes lens position adjustable instrument which changes spaces between a concave lens and a convex lens, even if there are not the concave lens 6a and convex lens 6b, it is possible to constitute spherical aberration correction instrument just by changing a position of the collimator lens 4. In this case, also in the structure shown in FIG. 4, since light which passes the beam splitting element 45 becomes non parallel light and light quantity incident into a side of the light quantity detector 15 also varies similarly to light quantity incident into the side of the objective lens 9 according to a change of a position of the collimator lens 4, correction is performed on the basis of changes of both to a spherical aberration correction amount.

Furthermore, although a single lens is used as the objective lens 9 in the above-mentioned embodiment, even if it is a group lens which has a high NA, there is no problem in any way.

Moreover, although the infinity system of optical head is shown as the optical head 1 in the above-mentioned embodiment, it is also good to be a finite system of optical head which does not use a collimator lens.

In addition, although an optical head of the polarized optical system is shown as the optical head 1 in the above-mentioned embodiment, it is also good to be a non-polarized optical system of optical head.

Embodiment 2

Figure 8:
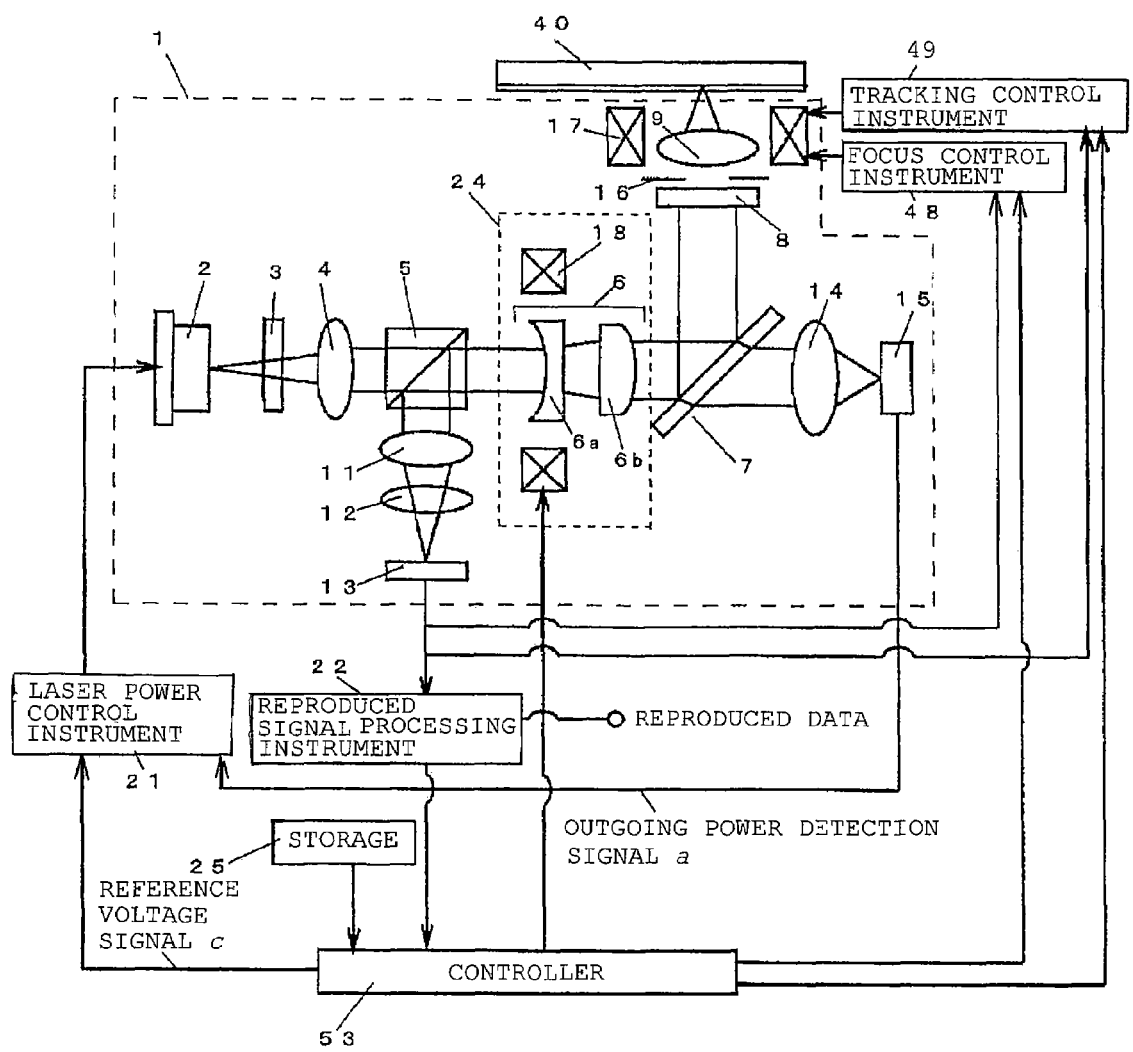
FIG. 8 is a schematic diagram of an optical information apparatus according to a second embodiment of the present invention.

FIG. 8 is a schematic diagram showing structure of an optical information apparatus in a second embodiment. In FIG. 7, the same reference numerals are used for the same constituents as those in FIG. 1 or 13, and their detailed description is omitted. In addition, in FIG. 8, reference numeral 40 denotes an optical recording medium having two layers of recording layers, reference numeral 48 denotes focus control instrument, reference numeral 49 denotes tracking control instrument, and reference numeral 53 denotes a controller.

Figure 9:
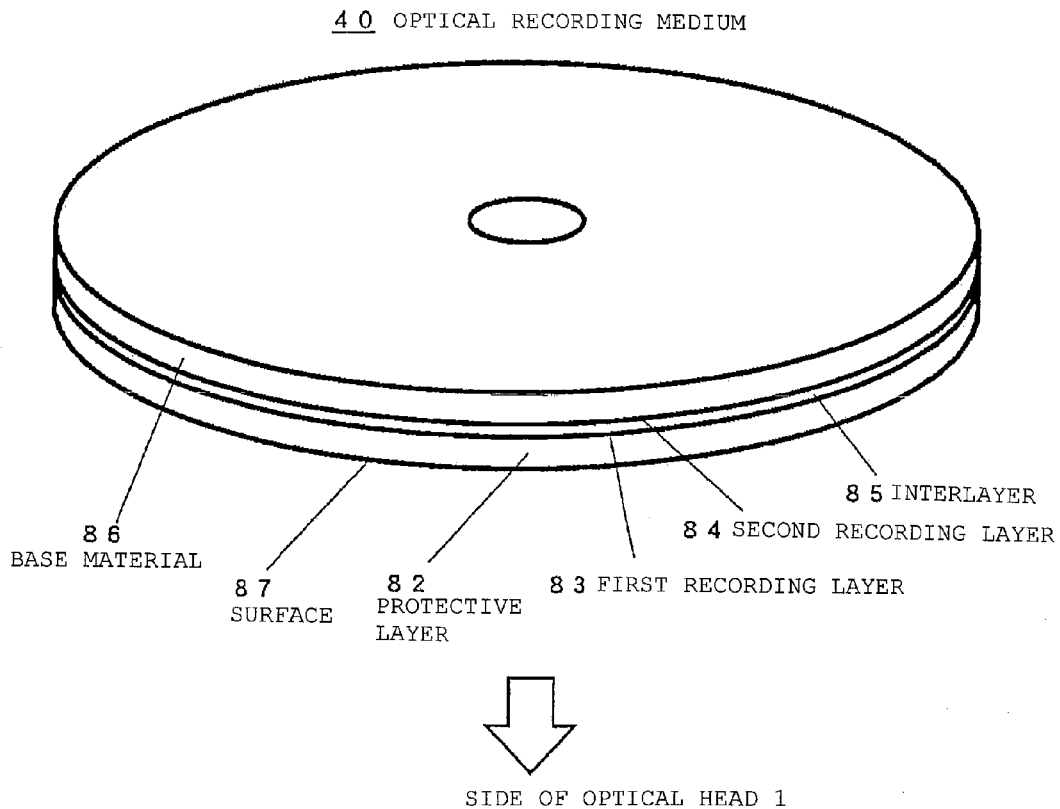
FIG. 9 is a schematic diagram of an optical recording medium 40 according to the second embodiment of the present invention.

FIG. 9 shows an example of a schematic diagram of an optical recording medium having two layers of recording layers. It has constitution of a surface 87, a protective layer 82, a first recording layer 83, an interlayer 85, a second recording layer 84, and a base material 86, which is a back, from an optical head side in order. The protective layer 82 and interlayers 85 are transparent media such as a resin. Since the interlayer 85 is between the first recording layer 83 and second recording layer 84, as to thickness from the optical recording medium 40 in the optical head side to each recording layer, the second recording layer 84 becomes thicker by the thickness of the interlayer 85 than that of the first recording layer 83.

The controller 53 sets the outgoing power of the laser 2 optimum for reproduction or record, and inputs it into the laser power control instrument 21 as a reference voltage signal c, and further, controls focus control instrument 48, tracking control instrument 49, and the spherical aberration correction instrument 24. In addition, the controller 53 includes laser power setting instrument. The spherical aberration correction instrument 24 corrects a spherical aberration by designation of the controller 53 so that the spherical aberration in each recording layer of the optical recording medium 40 may become minimum.

The operation of the optical information apparatus constituted as mentioned above will be below explained using FIGS. 8 to 11.

Similarly to the first embodiment, the controller 53 corrects the reference voltage signal c set in the laser power control instrument 21 according to a spherical aberration correction amount. Thereby, it becomes possible to keep at a predetermined value the outgoing power of an output in the side of the objective lens 9 regardless of the spherical aberration correction amount, i.e., the thickness of the protective layer 82 of the optical recording medium 40, and a position of the recording layer which is focused.

What is different in the second embodiment from the first embodiment is procedure at the time of migrating between recording layers (hereafter, layer-to-layer migration) which are focused, namely, in which record and/or reproduction are performed.

Figure 10:
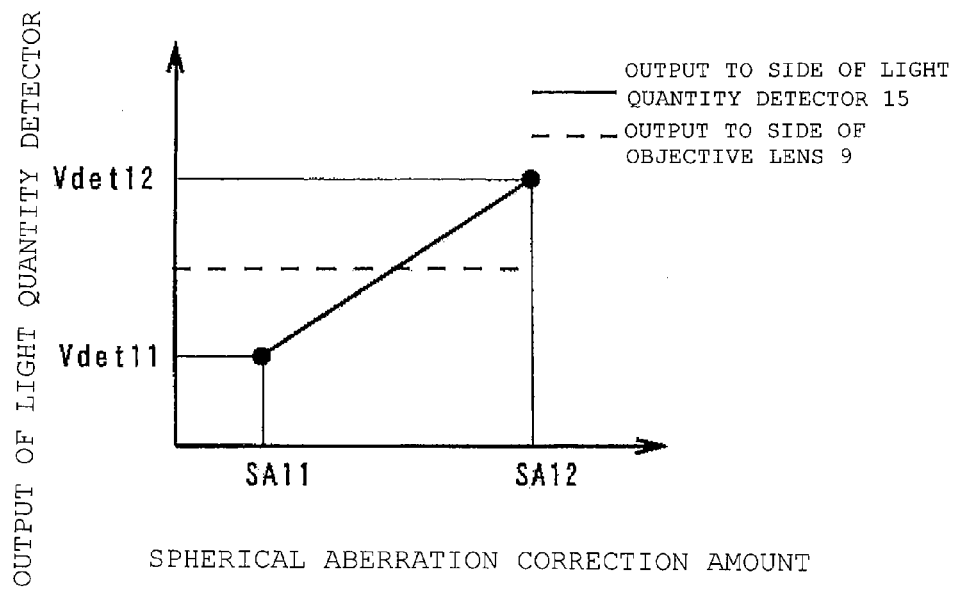
FIG. 10 is a graph showing relation between the spherical aberration correction amount and the signal level detected by a light quantity detector 15.

Let an optimal spherical aberration correction amount in the first recording layer 83 be S11, and let an optimal spherical aberration correction amount in the second recording layer 84 be SA12, and here, it is assumed that an output level of the light quantity detector 15 changes up to Vdet11 to Vdet12 (Vdet11<Vdet12) to the spherical aberration correction amount SA11 to SA12, as shown in FIG. 10. In addition, it is possible to determine the spherical aberration correction amount optimum for each recording layer of the optical recording medium 40 by predetermined study, for example, at the starting time of the optical information apparatus.

Further specifically, when reproducing the recorded information recorded on each recording layer of the optical recording medium 40 with the spherical aberration correction amount being changed by the spherical aberration correction instrument 24 by the designation from the controller 53 as preliminary correcting operation at the starting time of the optical information apparatus, it is possible to determine the spherical correction aberration amount that reproductive signal quality becomes optimal on the basis of information which includes jitter and is obtained from the reproductive signal processing instrument 22 at that time. Thereby, it becomes possible to set it at the spherical aberration correction amount optimum for each recording layer.

In addition, for example, when the spherical aberration correction instrument 24 is constituted of an actuator, the spherical aberration correction amount can be detected from a drive current of the actuator, and when the spherical aberration correction instrument 24 is constituted of a stepping motor, it can be detected from a number of steps from a reference position.

Figure 11:
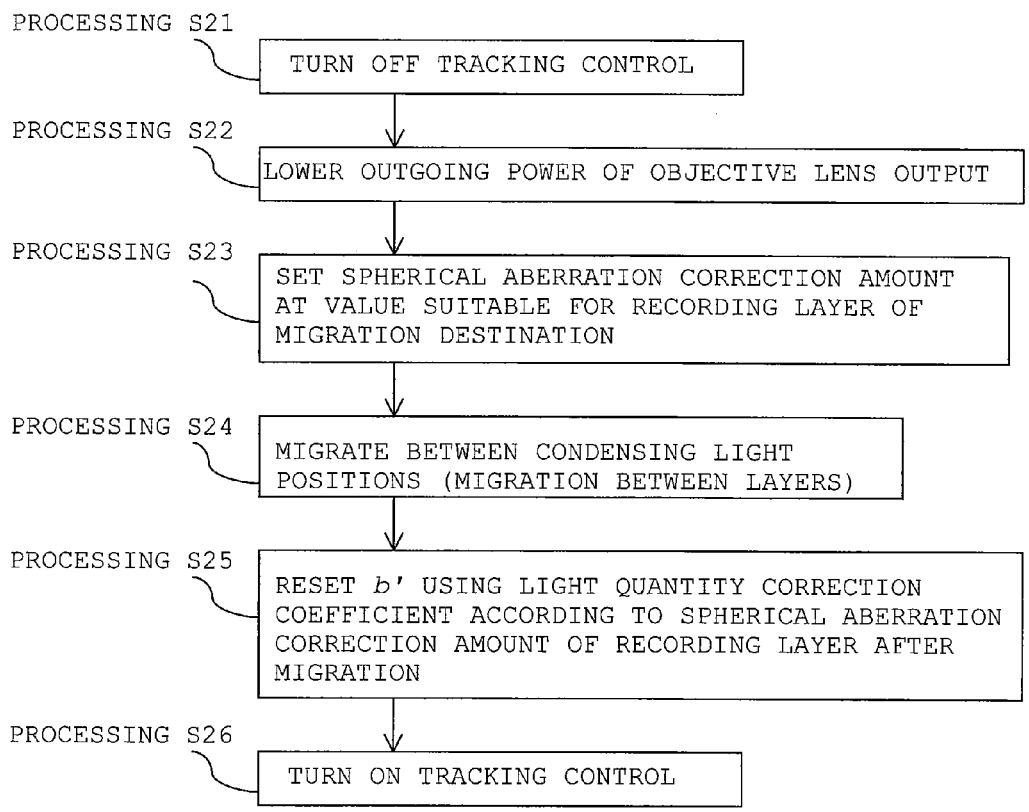
FIG. 11 is a flowchart which shows procedure at the time of migrating between recording layers, which are focused, according to the second embodiment of the present invention.
Figure 12:
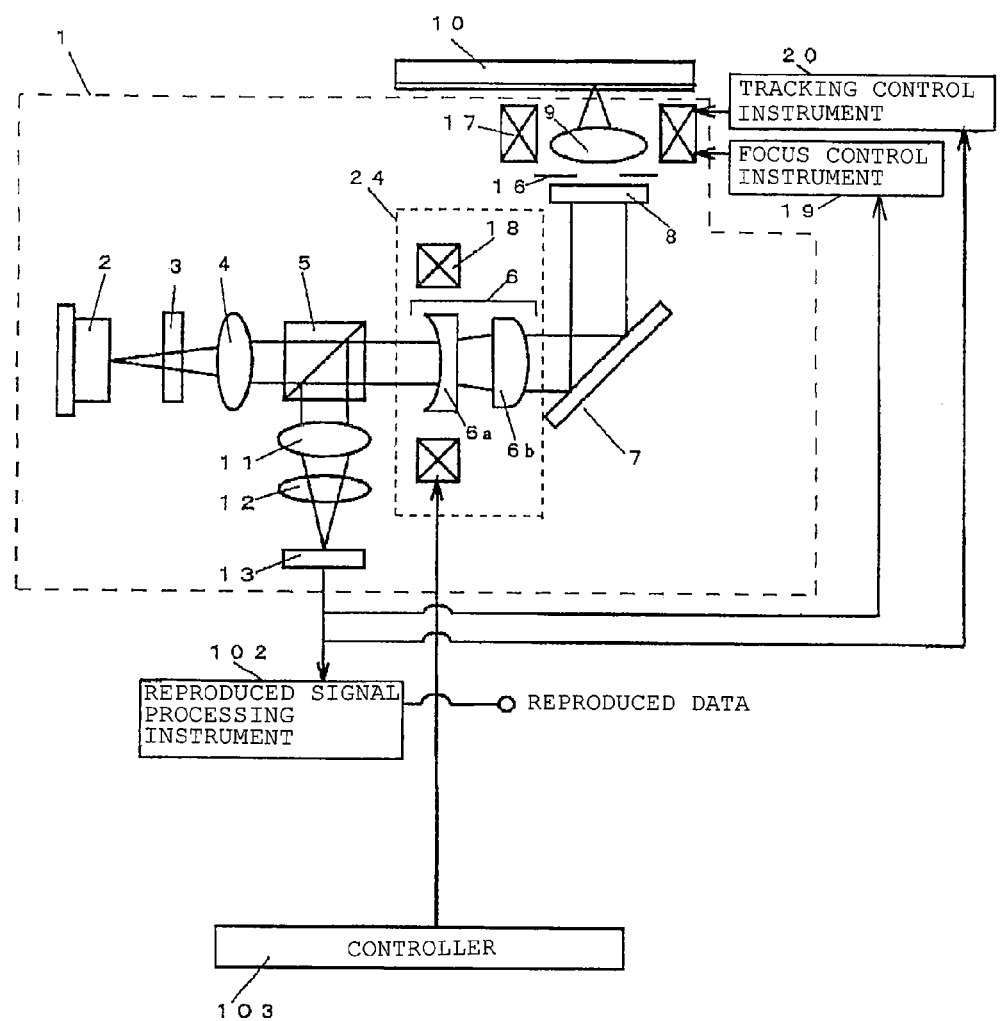
FIG. 12 is a schematic diagram of a conventional optical information apparatus.

FIG. 11 is an explanatory diagram about procedure at the time of performing the layer-to-layer migration including operation of preliminary correction of the present invention. Hereafter, explanation will be performed with referring to FIG. 11.

First, the controller 53 outputs a control signal to the tracking control instrument 49, and turns off tracking control (step S21).

Next, the controller 53 lowers the outgoing power of an output to the side of the objective lens 9 by a predetermined amount by lowering a value of the reference voltage signal c inputted into the laser power control instrument 21 by a predetermined amount (for example, 20%) (step S22).

Then, the spherical aberration correction amount is set at a value suitable for a recording layer of a migrating destination by designation of the controller 53 (step S23). Thereby, it is possible to perform stable focus control to the recording layer of the migrating destination, which is newly focused, in the state that spherical aberration correction is performed, and it is possible to prevent the focus control from being lost because of a failure of the layer-to-layer migration.

In addition, a reason why the outgoing power of the output to the side of the objective lens 9 is beforehand lowered at step S22 is to make it possible to migrate in the same procedure also in either case of layer-to-layer migration from the first recording layer 83 to the second recording layer 84 or layer-to-layer migration from the second recording layer 84 to the first recording layer 83. Thus, in the case of not executing step S22, when spherical aberration correction is given to the recording layer, which is newly focused, at step S23, for example, in the case of migrating to the second recording layer 84 from the first recording layer 83, a signal level detected by the light quantity detector 15 becomes small by setting the spherical aberration correction amount at SA11. For this reason, the outgoing power to the side of the objective lens 9 becomes large, and there is a possibility of degrading accidentally the recorded information recorded on the first recording layer 83. On the other hand, here, it is also conceivable to set a light quantity correction coefficient according to the spherical aberration correction amount of the second recording layer 84 in advance of step S23. Nevertheless, when migrating to the second recording layer 84 from the first recording layer 83 conversely, setting the light quantity correction coefficient according to the spherical aberration correction amount of the second recording layer in advance of step S23 increases the outgoing power of the output to the side of the objective lens 9, and there is a possibility of degrading accidentally the recorded information recorded on the second recording layer 84. Then, it becomes possible to perform in the same procedure also in the case of migration to either layer by lowering a setting value of the reference voltage signal c set by designation of the controller 53 before performing layer-to-layer migration to lower the outgoing power of the output to the side of the objective lens 9, and hence, it is possible to simplify control.

Here, it is a remarkable feature of this second embodiment to set the spherical aberration correction amount so as to be suitable for the recording layer which is newly focused after lowering the outgoing power of the output to the side of the objective lens 9 beforehand.

Then, it actually migrates to a target recording layer by the focus control instrument 48 (step S24).

Next, the controller 53 resets the reference voltage signal c using the light quantity correction coefficient according to the spherical aberration correction amount of the recording layer after the migration (step S25). The operation of this resetting is the same as that of the first embodiment. Thereby, it is possible to obtain the outgoing power of the output to the side of the objective lens 9 which is suitable for performing record and/or reproduction to the recording layer after the migration.

Then, next, while turning on tracking control (step S26), record and/or reproduction of information are given to the recording layer after the migration.

In addition, since a predetermined amount of the outgoing power of the output to the side of the objective lens 9 which is lowered at step S22 is required to be beyond an extent without a possibility of degrading recorded information recorded on a recording layer before layer-to-layer migration, and to be below a value from which the outgoing power of the output which makes stable layer-to-layer migration possible is obtained to the side of the objective lens 9, it is desirable to set it at 10% to 50%.

This makes it possible to stably migrate between recording layers in simple procedure without a possibility of accidentally degrading recorded information recorded on the optical recording medium 40 by power more than needed being irradiated on the optical recording medium 40 during reproduction.

Furthermore, although it was explained in this second embodiment that the optical recording medium 40 had two layers of recording layers, it is not limit to this, but, since it is also necessary in the case of having three or more layers of recording layers to correct a spherical aberration every recording layer, the present invention is useful regardless of the number of recording layers. In this case, what is necessary is just to decrease the outgoing power by the above-mentioned predetermined amount whenever layer-to-layer migration is performed to a recording layer which is further apart from the objective lens 9.

In addition, although the case that the outgoing power of an objective lens output was beforehand lowered at step S22 when either case of layer-to-layer migration from the first recording layer 83 to the second recording layer 84 or layer-to-layer migration from the second recording layer 84 to the first recording layer 83 was performed was explained in this second embodiment, it is not limited to this, but it is also sufficient to lower a value of the reference voltage signal c inputted into the laser power control instrument 21, that is, a laser power setting value only when the outgoing power of the objective lens output becomes large (for example, in the case of migrating to the second recording layer 84 from the first recording layer 83) when performing spherical aberration correction to a recording layer, which is newly focused, at step S23. Also because of this, it is possible to prevent the recorded information, recorded on the optical recording medium 40, from being degraded accidentally.

Furthermore, although the controllers 23 and 53, laser power control instrument 21, tracking control instrument 20 and 49, focus control instrument 19 and 48, and storage 25 which controlled the optical head 1 were shown in each of the above-mentioned embodiments as blocks which were independent of each other, it is also sufficient to be constituted integrally on the same integrated circuit such as an LSI or an IC. It is desirable that at least the controllers 23 and 53 and the laser power control instrument 21 are in monolithic structure.

Moreover, information processing apparatuses such as an audio and video digital disk recorder/player, a personal computer, and a car navigation apparatus are also included in the present invention, the information processing apparatuses mounting an above-described optical information apparatus and processing the information recorded or reproduced from optical recording media such as an optical disk, a magneto-optical disk, and an optical card.

In addition, the program according to the present invention is a program of making a computer execute the operation of all or a part of steps of the control method of the optical information apparatus of the present invention mentioned above, and may be a program which operates in collaboration with a computer.

In addition, the present invention is a medium which holds a program of making a computer execute the operation all or a part of steps of all or a part of a control method of the optical information apparatus of the present invention mentioned above, and may be a medium which is computer-readable, and from which the above-described program read executes the above-described operation in collaboration with the above-mentioned computer.

Furthermore, an above-described "a part of steps" of the present invention means some steps of a plurality of those steps, or instrument a part of operation of one step.

Moreover, a recording medium which records the program of the present invention, and which is computer-readable is also included in the present invention.

In addition, one utilizing form of the program of the present invention may be an aspect of being recorded in a recording medium which a computer can read, and operating in collaboration with the computer.

Furthermore, another utilizing form of the program of the present invention may be an aspect which is transmitted inside a transmission medium, is read by a computer, and operates in collaboration with the computer.

Moreover, ROM or the like is included as a recording medium.

In addition, the computer of the present invention mentioned above may be not only pure hardware such as a CPU, but also firmware, OS, and further, what includes a peripheral device.

Furthermore, as described above, the configuration of the present invention may be achieved in software or hardware.

Since the present invention is not dependent on the optical conditions in a design of an optical head and can respond to dispersion in thickness of a protective layer of an optical recording medium, and further, can keep the outgoing power to an objective lens output side at a predetermined value, it is possible to achieve an optical information apparatus which can obtain a stable control signal and a stable reproductive signal regardless of the thickness dispersion of the protective layer of the optical recording medium, and this is useful as an optical information apparatus which performs write-in and read-out of an information signal to an optical recording medium like an optical disk, a magneto-optical disk, or an optical card, and its control method.

The invention claimed is:

1. An optical information apparatus, comprising:
    a laser light source which emits a light beam;
    a light beam convergence system which has an objective lens which converges a light beam emitted from said laser light source;
    a spherical aberration correction instrument which is arranged on an optical axis of said light beam which links said laser light source and said objective lens, and corrects a spherical aberration generated on said optical recording medium;
    a light separating instrument which separates into plural beams a light beam emitted from said laser light source;
    a light quantity detection instrument which receives either light beam separated by said light separating instrument, and outputting an electric signal according to an amount of received light;
    a laser power control instrument which controls outgoing power of said laser light source on the basis of said electric signal of said light quantity detection instrument;
    a laser power correction instrument which performs such correction that the outgoing power of said laser light source changes according to a correction amount of the spherical aberration on the basis of a relationship between an outgoing power of a light beam emitted from said objective lens and an amplitude of the electric signal which said light quantity detection instrument outputs, said correction amount provided to said aberration correction instrument to correct said spherical aberration; and
    a memory instrument which stores said relationship between the outgoing power of the light beam emitted from said objective lens and the amplitude of the electric signal, output by said light quantity detection instrument.

2. The optical information apparatus according to claim 1, wherein said laser power correction instrument changes a target control signal which the laser power control instrument uses according to said correction amount of the spherical aberration.

3. The optical information apparatus according to claim 1, wherein said laser power correction instrument changes the outgoing power of said laser light source by control of said laser power control instrument by correcting said electric signal obtained in said light quantity detection instrument according to said correction amount of said spherical aberration.

4. The optical information apparatus according to claim 1, wherein said light separating instrument is provided so that said light quantity detection instrument receives light passed said spherical aberration correction instrument.

5. The optical information apparatus according to claim 1, wherein said light separating instrument is provided so that said light quantity detection instrument receives light before passing through said spherical aberration correction instrument.

6. An optical information apparatus, comprising:
    a laser light source which emits a light beam;
    a light beam convergence system which has an objective lens which converges a light beam emitted from said laser light source;
    a spherical aberration correction instrument which is arranged on an optical axis of said light beam which links said laser light source and said objective lens, and corrects a spherical aberration generated on said optical recording medium;
    a light separating instrument which separates into plural beams a light beam emitted from said laser light source;
    a light quantity detection instrument which receives either light beam separated by said light separating instrument, and outputting an electric signal according to an amount of received light;
    a laser power control instrument which controls outgoing power of said laser light source on the basis of said electric signal of said light quantity detection instrument; and
    a laser power correction instrument which performs such correction that the outgoing power of said laser light source changes according to a correction amount of the spherical aberration on the basis of a relationship between an outgoing power of a light beam emitted from said objective lens and an amplitude of the electric signal which said light quantity detection instrument outputs, said correction amount provided to said aberration correction instrument to correct said spherical aberration,
    wherein said laser power correction instrument performs a preliminary correction, which changes said outgoing power by a predetermined amount, before said correction.

7. The optical information apparatus according to claim 1, wherein said memory instrument is a nonvolatile memory.

8. The optical information apparatus according to claim 1, wherein said laser power correction instrument performs a preliminary correction, which changes said outgoing power by a predetermined amount, before said correction.

9. The optical information apparatus according to claim 8, wherein said laser power correction instrument performs said preliminary correction before a focal position of said objective lens migrates between recording layers, when said optical information apparatus performs record or reproduction of information to a multilayer optical recording medium which has a plurality of recording layers as an optical recording medium.

10. The optical information apparatus according to claim 9, wherein said laser power correction instrument performs said preliminary correction so as to decrease said outgoing power by said predetermined amount as distance between said recording layer which corresponds to a focal position of said objective lens and said objective lens becomes large.

11. The optical information apparatus according to claim 9, wherein said laser power correction instrument performs the correction of said outgoing power according to said correction amount of said spherical aberration after the focal point migration of said recording layer is complete after performing said preliminary correction of said outgoing power according to a position of said recording layer.

12. The optical information apparatus according to claim 1, wherein at least said laser power control instrument and said laser power correction instrument are constituted integrally on an integrated circuit.

13. An information processing apparatus, comprising the optical information apparatus according to claim 1, wherein information, recorded or reproduced, from said optical recording medium is processed.

14. A control method of an optical information apparatus, comprising a laser light source which emits a light beam, a light beam convergence system which has an objective lens which converges a light beam emitted from said laser light source, a spherical aberration correction instrument which is arranged on an optical axis of said light beam which links said laser light source and said objective lens, and corrects a spherical aberration generated on said optical recording medium, a light separating instrument which separates into plural beams a light beam emitted from said laser light source, a light quantity detection instrument which receives either light beam separated by said light separating instrument, and outputting an electric signal according to an amount of received light, and a laser power control instrument which controls outgoing power of said laser light source on the basis of said electric signal of said light quantity detection instrument, the control method comprising, a laser power correction step of performing such correction that the outgoing power of said laser light source changes according to a correction amount of said spherical aberration on the basis of a relationship between an outgoing power of a light beam emitted from said objective lens, and an amplitude of the electric signal which said light quantity detection instrument outputs, said correction amount provided to said aberration correction instrument to correct the spherical aberration,
wherein a preliminary correction step is performed, which changes said outgoing power by a predetermined amount, before said laser power correction step.

15. A recording medium which records a program of making a computer function and can be processed by a computer, in the control method of an optical information apparatus according to claim 14, as a laser power correction step of performing such correction that outgoing power of said laser light source changes according to said correction amount of said spherical aberration on the basis of the relationship between the outgoing power of a light beam emitted from said objective lens, and amplitude of an electric signal which said light quantity detection instrument outputs to the correction amount of a spherical aberration by said aberration correction instrument.

16. The optical information apparatus according to claim 1, wherein said objective lens converges the light beam emitted from said laser light source onto an optical recording medium.

17. The optical information apparatus according to claim 1, wherein said spherical aberration correction instrument corrects a spherical aberration generated on an optical recording medium.

18. The optical information apparatus according to claim 6, comprising a memory instrument which stores said relationship between the outgoing power of the light beam emitted from said objective lens and the amplitude of the electric signal, output by said light quantity detection instrument.

19. The optical information apparatus according to claim 6, wherein said laser power correction instrument changes a target control signal which the laser power control instrument uses according to said correction amount of the spherical aberration.

20. The optical information apparatus according to claim 6, wherein said laser power correction instrument changes the outgoing power of said laser light source by control of said laser power control instrument by correcting said electric signal obtained in said light quantity detection instrument according to said correction amount of said spherical aberration.

21. The optical information apparatus according to claim 6, wherein said light separating instrument is provided so that said light quantity detection instrument receives light passed said spherical aberration correction instrument.

22. The optical information apparatus according to claim 6, wherein said light separating instrument is provided so that said light quantity detection instrument receives light before passing through said spherical aberration correction instrument.

23. The optical information apparatus according to claim 18, wherein said memory instrument is a nonvolatile memory.

24. The optical information apparatus according to claim 6, wherein said laser power correction instrument performs said preliminary correction before a focal position of said objective lens migrates between recording layers, when said optical information apparatus performs record or reproduction of information to a multilayer optical recording medium which has a plurality of recording layers as an optical recording medium.

25. The optical information apparatus according to claim 6, wherein at least said laser power control instrument and said laser power correction instrument are constituted integrally on an integrated circuit.

26. An information processing apparatus, comprising the optical information apparatus according to claim 6, wherein information, recorded or reproduced, from said optical recording medium is processed.

27. The optical information apparatus according to claim 6, wherein said objective lens converges the light beam emitted from said laser light source onto an optical recording medium.

28. The optical information apparatus according to claim 6, wherein said spherical aberration correction instrument corrects a spherical aberration generated on an optical recording medium.

29. The optical information apparatus according to claim 24, wherein said laser power correction instrument performs said preliminary correction so as to decrease said outgoing power by said predetermined amount as distance between said recording layer which corresponds to a focal position of said objective lens and said objective lens becomes large.

30. The optical information apparatus according to claim 24, wherein said laser power correction instrument performs the correction of said outgoing power according to said correction amount of said spherical aberration after the focal point migration of said recording layer is complete after performing said preliminary correction of said outgoing power according to a position of said recording layer.

* * * * *